Aug. 5, 1952 S. I. MacDUFF 2,605,854
STEERING MECHANISM
Filed Nov. 18, 1948
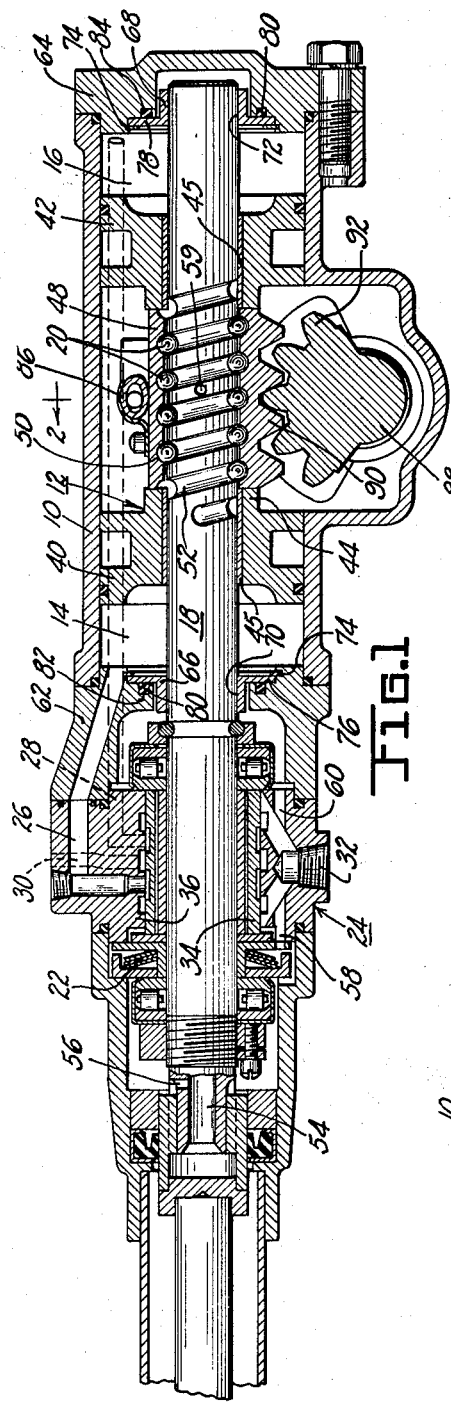
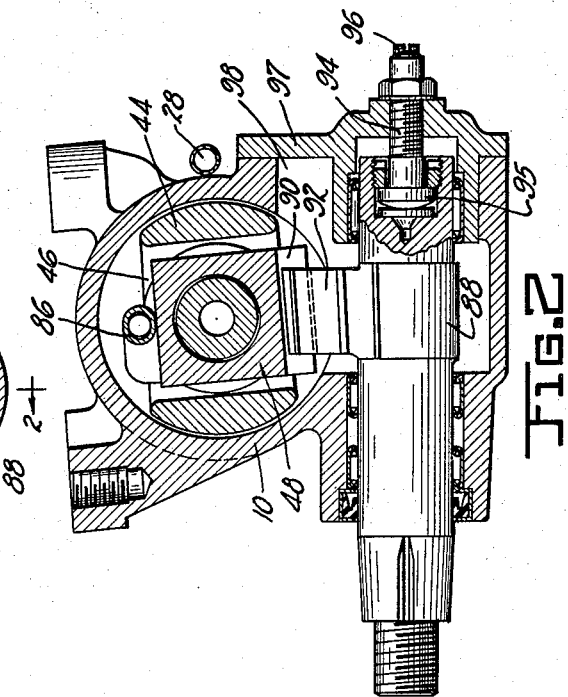
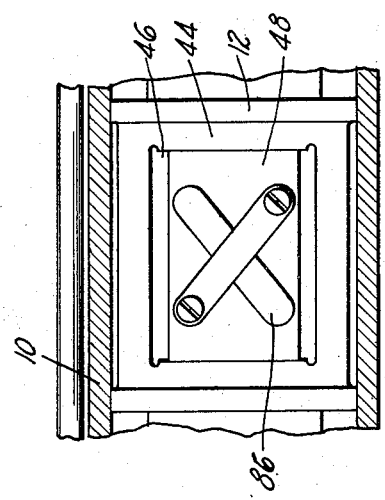
INVENTOR.
STANLEY I. MACDUFF
BY Cecil F Arens
ATTORNEY Patented Aug. 5, 1952

2,605,854

UNITED STATES PATENT OFFICE 2,605,854

STEERING MECHANISM

Stanley I. MacDuff, South Bend, Ind., assignor to Bendix Aviation Corporation, South Bend, Ind., a corporation of Delaware Application November 18, 1948, Serial No. 60,658

6 Claims. (Cl. 180—79.2)

This invention relates to steering gear construction and more particularly to novel means of piston construction for use with power operated steering mechanisms.

It is a very important object of the invention to provide a novel construction for minimizing deleterious effects due to misalignment of parts in a worm and nut steering gear of the hydraulic power actuated type.

A further object of the invention is to provide a novel construction in a hydraulic power steering mechanism of the concentric piston and ball nut type, wherein the nut may be adjusted laterally relative to the piston for preloading the balls.

It is also an object of the invention to provide a single means of adjustment in a hydraulic power steering mechanism of the concentric piston and ball nut type for controlling the backlash of the gears and for preloading the balls.

The above and other objects and features of the invention may be apparent from the following description taken in connection with the accompanying drawing which forms a part of this specification and in which:

Figure 1 is a longitudinal sectional view of one form of steering mechanism with which the invention is associated;

Figure 2 is a view in section taken on the lines 2—2 of Figure 1; and

Figure 3 is a top plan view of the central portion of the piston with parts broken away to show more clearly the manner of adjustably associating the worm and nut with the piston.

Referring now to Figure 1 of the drawing, in which the invention is illustrated in connection with a steering mechanism, the reference numeral 10 designates a housing or motor cylinder in which a piston 12 is positioned for axial movement within the cylinder. The piston divides the cylinder into two opposed chambers 14 and 16. Movement of the piston may be accomplished through rotation of shaft 18 which extends through the piston and housing and which is drivably connected to the piston through a plurality of balls 20. The rotative action of the shaft is translated into an axial force on the nut to thereby move the piston to the right or left depending upon the direction of rotation of the shaft. This piston movement is augmented by fluid under pressure from a source, not shown, acting in one or the other of chambers 14 and 16 when the resistance offered to turning the shaft 18 exceeds a predetermined value determined by the strength of a spring 22. The spring normally holds an open center valve 24 in the position shown to thereby admit fluid pressure simultaneously to the chambers 14 and 16 through the passages 26 and 28 respectively. Since the effective areas of the ends of the piston exposed to fluid pressure are the same there is no movement of the piston at this time when equal pressures are acting on its ends. The valve is equipped with inlet and outlet passages 30 and 32 communicating with the interior of the valve. Deflection of the spring 22, when the resistance offered to steering exceeds a predetermined value, permits a valve spool 34 to move axially relative to body member 36, so that one of the passages 26 and 28 is restricted to inlet pressure and opened wider to exhaust pressure, and the other of the passages is restricted to exhaust pressure and opened wider to inlet pressure. Since this function of the valve of the steering mechanism forms no part of the invention a further discussion of the operation of the valve is believed unnecessary. A more detailed discussion of the operation of an open center type valve can be found in Patent No. 1,790,620.

The piston 12, which is arranged concentrically of the shaft, is provided with enlarged end sections 40 and 42 and a reduced intermediate section 44. The intermediate section is constructed with a rectangular slot 46 therein for receiving a rectangular nut member 48, which slides laterally or floats in the slot. The nut abuts the ends of the slot, as best shown in Figures 1 and 3, thus restricting axial movement of the nut. The enlarged ends of the piston are provided with bushings 45 forming radial and axially slidable bearings for the shaft 18. The nut member 48 is formed with interior helical grooves 50 for receiving the balls 20 which also roll in mating helical grooves 52 of the rotatable shaft to thereby drivably connect the nut to said shaft. The shaft 18 is equipped with a longitudinal bore 54 in order to equalize the pressure acting on the ends of the shaft. This longitudinal bore communicates with the exhaust port 32 through radial passage 56 of the shaft and passage 58 in the valve body. The longitudinal bore also communicates with the space between the piston ends through another radial passage 59. A passage 60 in the valve body communicates the right side of the valve 24 to the exhaust port. With this arrangement there is provided both a balanced valve and a balanced shaft since both are as, aforementioned, in communication with the exhaust port at their ends.

The motor cylinder is furnished with end covers 62 and 64 in which seal bushings 66 and 68 respectively are disposed for lateral displacement. These bushings 66 and 68 are bored at 70 and 72 respectively to receive the shaft 18 which fits snugly in the bores to minimize leakage of fluid from chambers 14 and 16. The bushings are held in position by snap rings 74 which fit into grooves in the end covers so that a portion of the snap rings press against flanges 76 and 78 of the bushings 66 and 68 respectively. These flanges ride or float on elastic seal rings 80 carried in grooves 82 and 84 of the end covers to thereby provide seals between the end covers and seal bushings. It will be noted that there is a radial space between the bushings and the end covers to allow for radial or lateral movement of the bushings to compensate for eccentricities of the coaxially arranged parts such as the piston and bearings. This arrangement also allows for lateral distortion of the shaft 18.

To return the balls from one end of the nut to the other after the balls have passed out of the grooves in the nut a transfer tube 86 is provided. This type of anti-friction screw thread is familiar to those skilled in the art and need not be discussed further except to point out that unless the balls are made the exact size of the grooves, which is undesirable because this tends to increase the friction of the nut, there will be considerable clatter caused by end play between the worm and nut. To eliminate this end play the balls are preloaded radially. In the present embodiment of the invention the balls are preloaded by laterally shifting the nut in the piston.

The nut 48 is drivably connected to a rockshaft 88 through the medium of a rack 90 integral with the nut, and a gear sector 92 securely fixed to the rockshaft and arranged in meshing relationship with the rack. The teeth of the sector are generated to provide an axially tapering tooth sector.

The aforementioned preloading of the balls may be accomplished by axial adjustment of the rockshaft, as best shown in Figure 2, which movement of the latter shaft takes up backlash and creates a pressure or separating force between the intermeshing gear sector and rack. This pressure is transmitted through the balls to the shaft and from the shaft through the bearings 45 to the piston 12. The piston, in turn, transmits this load to the cylinder wall. A dual adjustment is thus obtained through the axial shifting of the rockshaft. Any suitable adjusting device for the rockshaft may be employed, such for example as the one shown, which comprises a stub shaft 94 having a swivel end connection 95 with the rockshaft and a threaded end portion 96 threadedly engaging a cover plate 97 adapted to fit over an opening 98 in the cylinder.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a manually operated steering gear mechanism of the type utilizing hydraulic power to assist steering, the combination of a motor cylinder with a piston therein, bearings mounted in the ends of the piston, a rotatable shaft extending through the cylinder and piston and carried by said bearings, said piston being arranged concentrically of the shaft for axial movement therealong, a nut carried by said shaft, mating helical grooves in the nut and on a portion of said shaft, and a plurality of balls in said helical grooves for drivably connecting the nut to said shaft to thereby move said nut axially in response to rotation of the shaft, said piston having a lateral opening for receiving said nut, said lateral opening having sides forming shoulders against which said nut abuts.

2. In a manually operated steering gear mechanism of the type utilizing hydraulic power to assist steering, the combination of a motor cylinder with a piston therein, a bearing in each end of the piston, a rotatable shaft extending through the cylinder and carried in the bearings, said piston being arranged concentrically of the shaft for axial movement therealong, a nut carried by said shaft, mating helical grooves in the nut and on a portion of said shaft, and a plurality of balls in said helical grooves for drivably connecting the nut to said shaft to thereby move said nut axially in response to rotation of said shaft, said piston having a lateral opening for receiving said nut, said lateral opening having sides forming shoulders against which said nut abuts, and adjustable means for causing relative lateral movement between said nut and piston for preloading the balls.

3. In a manually operated steering gear mechanism of the type utilizing hydraulic power to assis steering, the combination of a motor cylinder with a piston therein having a slot located intermediate its ends, a rotatable shaft in the motor cylinder, said piston arranged concentrically on said shaft for axial movement therealong, a nut concentric with said shaft and positioned in said slot for lateral movement relative to said piston, said nut and a portion of said shaft having mating helical grooves therein, a plurality of balls in said grooves arranged for drivably connecting the nut to said shaft to thereby impart axial motion to said nut upon rotation of said shaft, said slot having ends against which the nut abuts, and means for moving said nut laterally in the slot to put a preload on said balls.

4. In a manually operated steering gear mechanism of the type utilizing hydraulic power to assist steering, the combination of a motor cylinder with a piston therein having a slot located intermediate its ends, a rotatable shaft in the motor cylinder, bearings in the piston for supporting said shaft, said piston arranged concentrically on the shaft for axial movement therealong, floatable seals located in the ends of the cylinder and supported on said shaft, said seals being held against the ends of the cylinder in a manner to permit limited lateral distortion of the shaft caused by eccentricities between said shaft, bearings, and piston, a nut concentric with the shaft and positioned in said slot for lateral movement relative to said piston, said nut and a portion of said shaft having mating helical grooves therein, a plurality of balls in said grooves arranged for drivably connecting the nut to said shaft to thereby impart axial motion to said nut upon rotation of said shaft, said slot having ends against which the nut abuts, and means for moving said nut laterally in the slot to put a preload on said balls.

5. In a manually operated steering gear mechanism of the type utilizing hydraulic power to assist steering, the combination of a motor cylinder with a piston therein having a slot located intermediate its ends, a rotatable shaft in the motor cylinder, said piston arranged concentrically on the shaft for axial movement therealong, bearings in the piston for supporting said shaft, a nut concentric with the shaft and positioned in said slot for lateral movement relative to said piston, said slot having ends against which the nut abuts, said nut and a portion of said shaft being formed with mating helical grooves therein, a plurality of balls in said grooves arranged for drivably connecting the nut to said shaft to thereby impart axial motion to said nut upon rotation of said shaft, a rack carried by said nut, an axially shiftable rockshaft in the cylinder, a gear sector arranged in meshing relationship to said rack and securely mounted on the rockshaft for rotating the same, said gear sector and rack being so formed that axial movement of said rockshaft will cause lateral displacement of said nut, and means for moving said rockshaft axially.

6. In a manually operated steering gear mechanism of the type utilizing hydraulic power to assist steering, the combination of a motor cylinder with a piston therein, said piston having axial and lateral openings therein, a rotatable shaft passing through the axial opening, a nut concentrically positioned on the shaft and slidably located in the lateral opening, said lateral opening having sides forming abutments for the nut to thereby restrict its axial movement, mating helical grooves in the nut and on a portion of the shaft, and a plurality of balls in said helical grooves.

STANLEY I. MacDUFF.

REFERENCES CITED

The following references are of record in the file of this patent:

UNITED STATES PATENTS

| Number | Name | Date |
|---|---|---|
| 1,193,133 | Flora | Aug. 1, 1916 |
| 1,343,846 | Rapson | June 15, 1920 |
| 1,937,485 | Davis | Nov. 28, 1933 |
| 1,967,482 | Schmidt | July 24, 1934 |
| 2,073,717 | Twyman | Mar. 16, 1937 |
| 2,266,923 | Trbojevich | Dec. 23, 1941 |
| 2,267,524 | Hawkins | Dec. 23, 1941 |
| 2,388,038 | Briggs | Oct. 30, 1945 |
| 2,410,049 | Davis | Oct. 29, 1946 |

FOREIGN PATENTS

| Number | Country | Date |
|---|---|---|
| 354,327 | Great Britain | Aug. 4, 1931 |